United States Patent
McFarland et al.

(10) Patent No.: US 10,831,367 B2
(45) Date of Patent: *Nov. 10, 2020

(54) EFFICIENT TEMPORARY DYNAMIC ANCHOR POINTS WITHIN AND BETWEEN APPLICATION DOCUMENT(S)

(71) Applicant: International Business Machines Corporation, Armonk, NY (US)

(72) Inventors: Daniel D. McFarland, Charlotte, NC (US); Susan E. Smith, Talking Rock, GA (US); Nathan G. Steffenhagen, Eau Claire, WI (US); Chin-Hsiu Yu, Edison, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/418,170

(22) Filed: May 21, 2019

(65) Prior Publication Data

US 2019/0272097 A1    Sep. 5, 2019

Related U.S. Application Data

(63) Continuation of application No. 15/818,755, filed on Jun. 14, 2016, now Pat. No. 10,353,583.

(51) Int. Cl.
*G06F 3/048*    (2013.01)
*G06F 3/0489*    (2013.01)
*G06F 3/0481*    (2013.01)
*G06F 3/0484*    (2013.01)
*G06F 3/0483*    (2013.01)

(52) U.S. Cl.
CPC ........ *G06F 3/04892* (2013.01); *G06F 3/0483* (2013.01); *G06F 3/0484* (2013.01); *G06F 3/04812* (2013.01); *G06F 3/04897* (2013.01)

(58) Field of Classification Search
None
See application file for complete search history.

(56) References Cited

U.S. PATENT DOCUMENTS

| 6,014,140 A | 1/2000 | Strand |
| 6,993,707 B2 | 1/2006 | Baker et al. |

(Continued)

OTHER PUBLICATIONS

Banerjee et al. "Method and System for Sharing Bookmarks during Collaborative Dynamic Web Research", An IP.com Prior Art Database Technical Disclosure, IP.com No. IPCOM000214070D, Jan. 2012.

(Continued)

*Primary Examiner* — William C Trapanese
(74) *Attorney, Agent, or Firm* — Brown & Michaels, PC; Jay Wahlquist

(57) ABSTRACT

Navigating within a document to a specific cursor location within an open document which a user has marked with a temporary anchor point by receiving a retrieval keystroke within the document from the user; verifying the retrieval keystroke relates to a temporary anchor point; and based on the verified retrieval keystroke, a computer moving a cursor to the location within the document at which the temporary anchor point associated with the verified retrieval keystroke is located, without additional user interaction with the open document.

19 Claims, 5 Drawing Sheets

(56) References Cited

U.S. PATENT DOCUMENTS

| | | | |
|---|---|---|---|
| 7,089,278 B1* | 8/2006 | Churchill | G06Q 10/10 709/203 |
| 7,783,979 B1 | 8/2010 | Leblang et al. | |
| 8,046,323 B2 | 10/2011 | Ma et al. | |
| 8,533,199 B2 | 9/2013 | Malla | |
| 2003/0074416 A1* | 4/2003 | Bates | G06F 16/9562 709/217 |
| 2005/0034063 A1* | 2/2005 | Baker | G06F 16/9562 715/241 |
| 2008/0177858 A1 | 7/2008 | Aamio et al. | |
| 2009/0327953 A1* | 12/2009 | Honkala | G06F 3/04886 715/804 |

OTHER PUBLICATIONS

"Method and apparatus for automatically bookmarking and sharing user interest area within a document", An IP.com Prior Art Database Technical Disclosure, IP.com No. IPCOM000193847D, Mar. 2010.

"Dynamic bookmarking within web pages", An IP.com Prior Art Database Technical Disclosure, IP.com No. IPCOM000134615D, Mar. 2006.

"Add or delete bookmarks", retrieved from https://support.office.com/en-US/article/Add-or-delete-bookmarks-f68d781f-0150-4583-a90e-a4009d99c2a0, Mar. 2016.

List of related applications.

* cited by examiner

EFFICIENT TEMPORARY DYNAMIC ANCHOR POINTS WITHIN AND BETWEEN APPLICATION DOCUMENT(S)

BACKGROUND

The present invention relates to establishing temporary anchor points, and more specifically to temporary, dynamic anchor points within and between documents.

Devices, such as mobile devices, have small screens which can make editing, navigating, and reading a large document difficult. It would be beneficial for a user to be able to quickly navigate between sections of large document as well as sections of multiple documents to quickly locate specific sections without having to scroll through the entire document.

SUMMARY

According to another embodiment of the present invention, a computer program product for navigating within multiple documents which are open in multiple open programs on a computer is disclosed. The computer comprising at least one processor, one or more memories, one or more computer readable storage media, the computer program product comprising a computer readable storage medium having program instructions embodied therewith. The program instructions executable by the computer to perform a method comprising: receiving, by a controlling application of the computer, temporary anchor points set by a user in the multiple documents open in the multiple open programs without additional user interaction with the programs; receiving, by the controlling application of the computer, a request from the user comprising a keystroke; identifying, by the controlling application of the computer, the keystroke, an association of the keystroke with an open program of the multiple open programs, and a temporary anchor point previously set by the user within a document open in the open program which was associated with the keystroke; and sending, by the controlling application of the computer, a request to the open program which is associated with the keystroke, to cause the open program to move a cursor to the temporary anchor point within the open document in the open program.

According to another embodiment of the present invention, a computer system for navigating within multiple documents which are open in multiple open programs on a computer is disclosed. The computer comprising at least one processor, one or more memories, one or more computer readable storage media having program instructions executable by the computer to perform the program instructions. The program instructions comprising: receiving, by a controlling application of the computer, temporary anchor points set by a user in the multiple documents open in the multiple open programs without additional user interaction with the programs; receiving, by the controlling application of the computer, a request from the user comprising a keystroke; identifying, by the controlling application of the computer, the keystroke, an association of the keystroke with an open program of the multiple open programs, and a temporary anchor point previously set by the user within a document open in the open program which was associated with the keystroke; and sending, by the controlling application of the computer, a request to the open program which is associated with the keystroke, to cause the open program to move a cursor to the temporary anchor point within the open document in the open program.

DETAILED DESCRIPTION

In an embodiment of the present invention, the temporary anchor points may be invoked by a user who is editing or reading the document via keystrokes or comparable actions. The anchor points are accessible from anywhere within the document or file by using a key combination and/or file menu. The anchor points allow fast jumping between documents or previously marked locations based on cursor location. It should be noted that the anchor points are temporary and are only present for a session, which is the time the document is open within an application until the application ceases to run, after which the anchor point is removed from the memory of the application. The documents may include, but are not limited to, word processing documents, spreadsheets, and/or binary document formats. The methods of the present invention may be used with mobile devices, other standard screen devices or multiple screens.

In another embodiment, multiple documents open in the same or in different applications may have anchor points set by a user. A central application may keep track of the anchor points and have access to a repository with defined keystrokes associated with anchor points and/or users. The anchor points allow a user to navigate quickly between specific portions of each of the documents in the multiple applications without having to scroll, use page up, page down commands or a file menu.

It should be noted that since the present invention uses application program interfaces (API) and applications or programs which support multiple documents open at a time and functionality which allows switching between windows. The application or a controlling program recognizes a request for an anchor point and tracks the anchor points currently stored and passes the location of the anchor points via the API to the requested document's related application to bring the cursor to the specific document and position.

Figure 1:
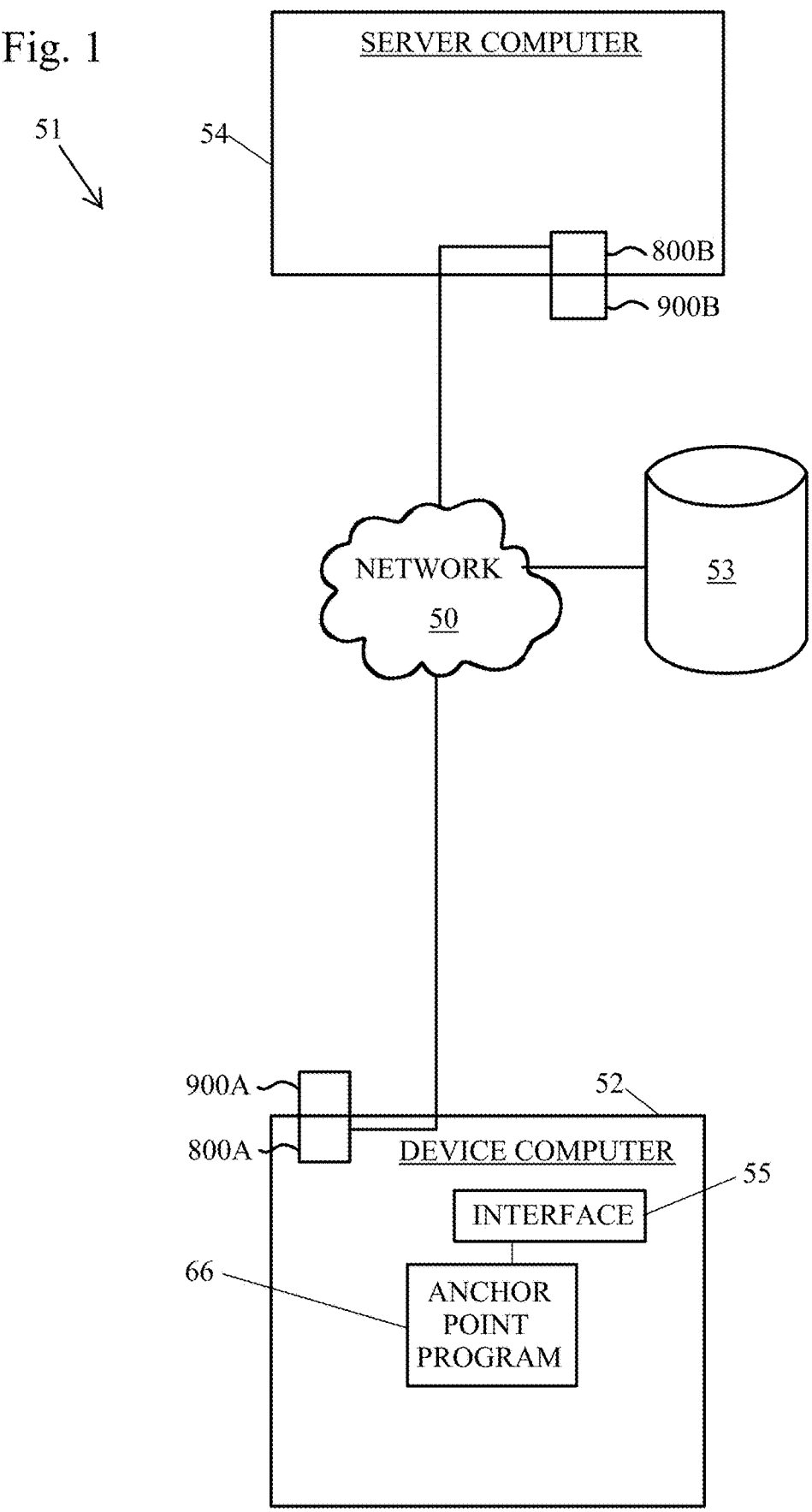
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computer 52, a repository 53, and a server computer 54 connect to network 50. In other exemplary embodiments, network data processing system 51 may include additional client or device computers, storage devices or repositories, server computers, and other devices not shown.

The device computer 52 may contain an interface 55, which may accept commands and data entry from a user. The commands may be regarding temporary dynamic anchor points within a document or multiple documents. The interface can be, for example, a command line interface, a graphical user interface (GUI), a natural user interface (NUI) or a touch user interface (TUI). The device computer 52 preferably includes an anchor point program 66. While not shown, it may be desirable to have the anchor point program 66 be present on the server computer 54. The device computer 52 includes a set of internal components 800a and a set of external components 900a, further illustrated in FIG. 5.

Figure 5:
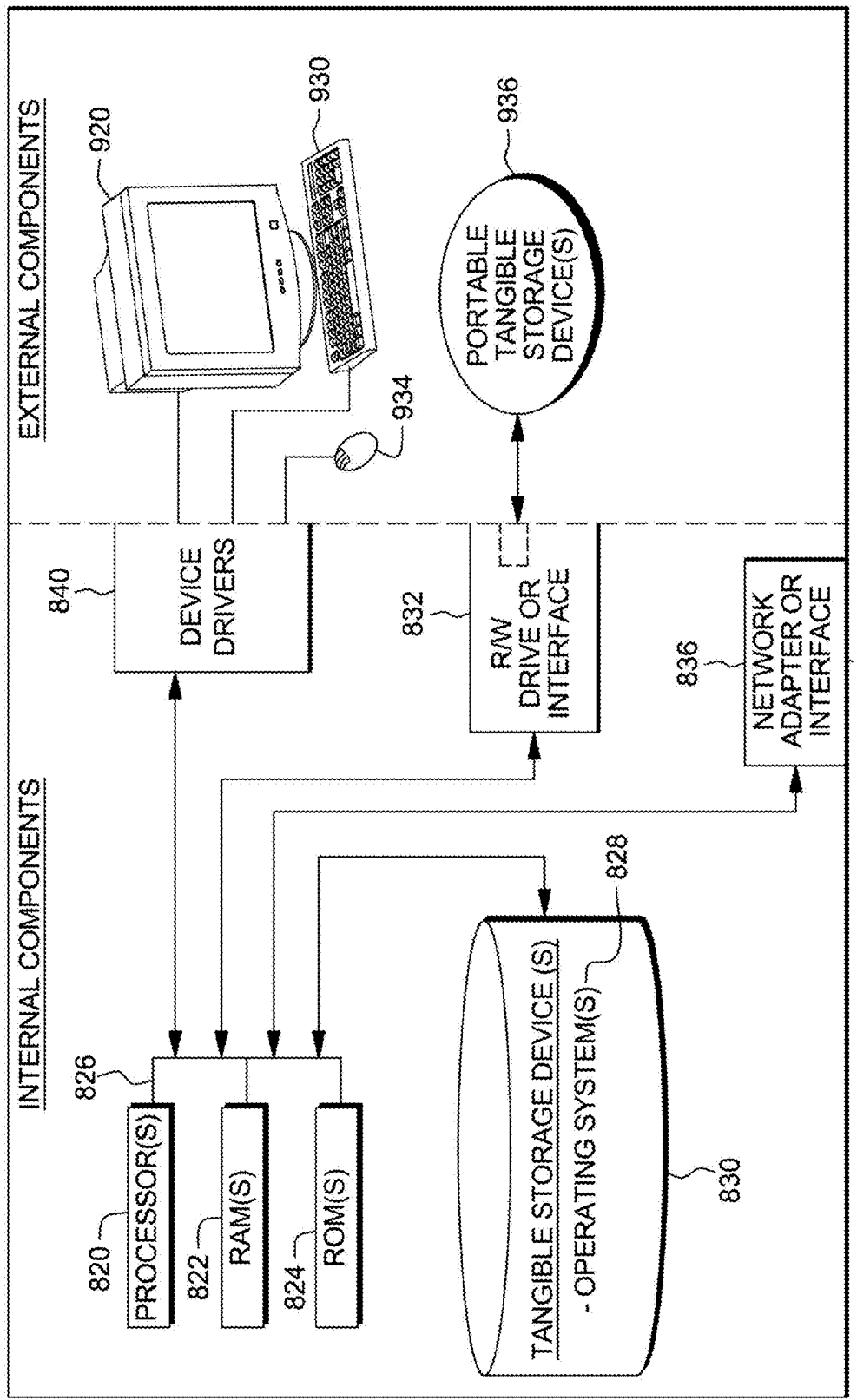
FIG. 5 illustrates internal and external components of a device computer and a server computer in which illustrative embodiments may be implemented.

Server computer 54 includes a set of internal components 800b and a set of external components 900b illustrated in FIG. 5. In the depicted example, server computer 54 provides information, such as boot files, operating system images, and applications to the device computer 52. Server computer 54 can compute the information locally or extract the information from other computers on network 50. The server computer 54 may contain the anchor point program 66.

Figure 2:
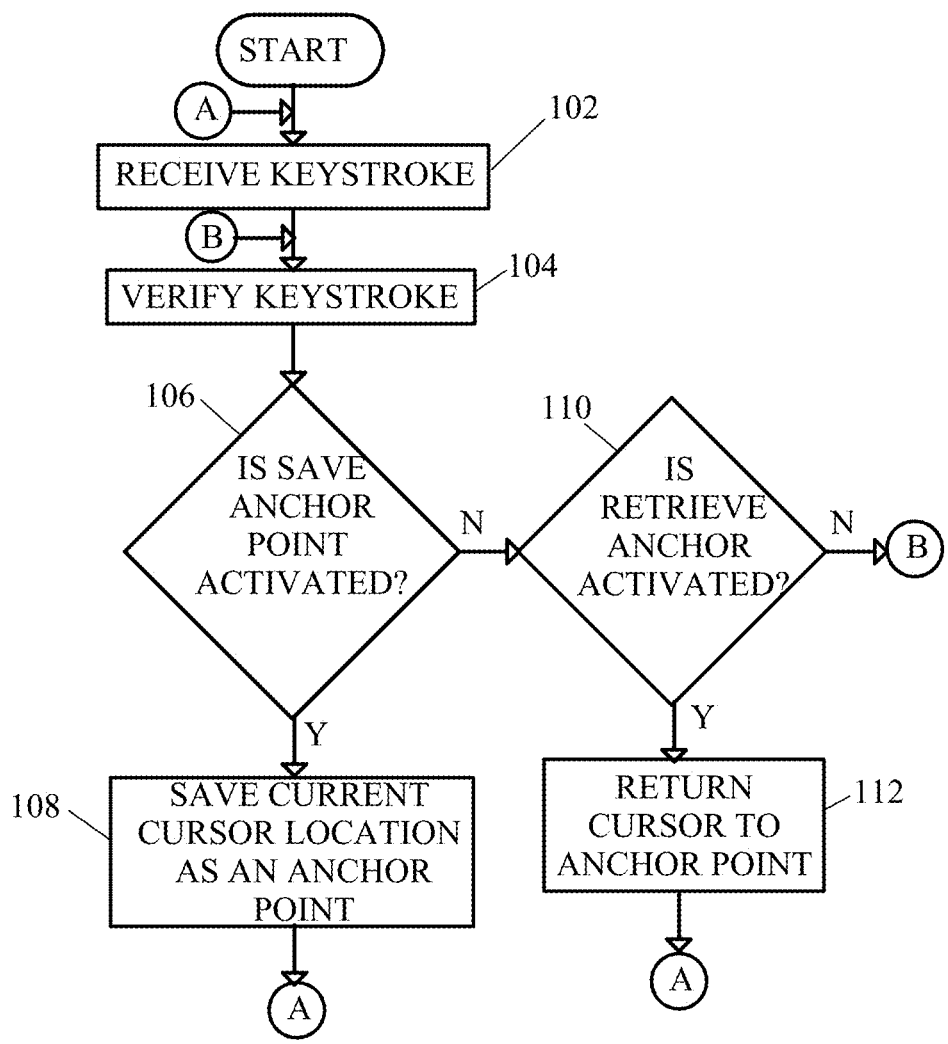
FIG. 2 shows a flow diagram of a method of using temporary dynamic anchor points within a document or between multiple documents.

FIG. 2 shows a flow diagram of a method of using temporary dynamic anchor points within a document.

In this embodiment, the anchor point or bookmark is dynamic and temporary and allows for navigation between cursor locations in multiple documents. The dynamic anchor point is used by a user while the document is open and is removed or forgotten once the application in which document is being displayed has been closed or completely exited. The anchor points are not application specific and may be used with word processing, spreadsheets, binary formatted applications or other documents. While one anchor point is discussed, multiple anchor points may be saved or set during a session by the user. The anchor point, once set, is accessible anywhere in the document through a specific keystroke or gestures or input established by the user. This embodiment allows fast jumping back to a temporary, previously marked location within a single document based on the cursor location. The anchor points may be established and used during editing of a document.

Specific keystrokes may be set as default to a particular set of keystrokes to allow up to n anchor points to be stored and referenced. For example, Using a selected keystroke combination of CTRL+ALT+SHIFT+<n> where n=1-0, as an example, CTRL+ALT+SHIFT+<n> could be set to mark/re-mark a current cursor location and then CTRL+ALT+<n> (same number and similar combination, but without SHIFT) may be used to activate and go to the prior saved anchor point.

For example, CTRL+ALT+SHIFT+1 sets/resets cursor location 1 and CTRL+ALT+1 activates and moves to previously selected location 1 whether the user is in the same document.

In a first step, a keystroke is received within a program (step 102), for example by an anchor point program 66. The keystroke may be a combination of keys or a combination of gestures or other input from a user. Furthermore, while the functions keys from the keyboard may be used, gestures drawn on the screen, using menu actions, using physical buttons or other actions may also be used.

The keystroke is verified (step 104), for example by the anchor point program 66. The verification may be accomplished by comparing the received keystroke to a defined keystroke associated with a user, stored in a repository, for example repository 53. The verification determines whether the keystroke is a retrieval keystroke or a set keystroke.

For example, a keystroke of F1+Y may indicate that the current location of the cursor within a document is to be saved or set as an anchor point, where a keystroke of F2+Q may indicate to move the cursor within a document to a saved location or anchor point or retrieve the anchor point within a document.

If the function of saving an anchor point is activated (step 106), for example by a set keystroke, the anchor point program 66 saves the current cursor location point as an anchor point (step 108) and the method returns to step 102 of receiving a keystroke.

If a function of saving anchor points is not activated (step 106), and a retrieve anchor point is activated (step 110), based on the verified retrieve keystroke, an anchor point is retrieved and the cursor is moved to the anchor point within the document (step 112) and the method returns to step 102 of receiving a keystroke.

If the function of saving anchor points is not activated (step 106) and retrieving an anchor point is not activated (step 110), the method returns to step 104 of verifying a keystroke.

For example, a user may be editing a 200 page document and, on page 75, a user may need to edit a particular section of text. Instead of scrolling up and down (or page up/page down) to find the information that is needed to view or copy/paste from another page in the document and then manually scroll up/down back to page 75, the user would enter a keystroke, the keystroke would be verified a set keystroke to place an anchor point save point on page 75 where the edit needs to take place. The user can retrieve the information needed for the edit and then enter in a different keystroke, for example a retrieve keystroke to return to page 75 without scrolling up/down or page up/page down, allowing for quick and easy navigation within the document by the user.

In another example, editing a very large spreadsheet that consists for 20+ sheets, each with 50+ columns and thousands of rows, different users will have different needs. The different users can establish different key reference anchor points for themselves for that session that can be reset and changed on demand.

More specifically, when a user is editing a spreadsheet with 20 sheets, a user can use a set keystroke to place an anchor point at the current location, for example on cell A25 on sheet 10, and then navigate to other sheets and retrieve/copy the needed data. For example, the user may be present in cell F100 on sheet 18, and then enter a different keystroke to return to the anchor point in cell A25 and sheet 10 immediately without having to navigate back through normal screen options.

In an alternate embodiment, anchor points are created by a user through defined hotkeys/gestures that can be reset as needed and utilized for a current session only. The anchor point allows for active switching between specific points within an application or between applications through the use of API for that session and is implemented via an application and/or operating system service, which handles communication between applications or within a single application. A controlling application, either as a standalone application or integrated into the operating system, may be used to detect the activation of the hotkey/gesture and may then pass that request on to the appropriate application or program previously established. APIs may be used to handle the communication between the applications within the controlling application or the operating system. It should be noted that the controlling application may store the location information regarding the temporary anchor points in memory and the location within the memory would be terminated when the application ceases to run. In one embodiment, previously set anchors may be removed or cleared when a document is closed, but the removal would still be a removal from the controlling application memory storage and would not be stored or removed within the document being referenced.

Figure 4:
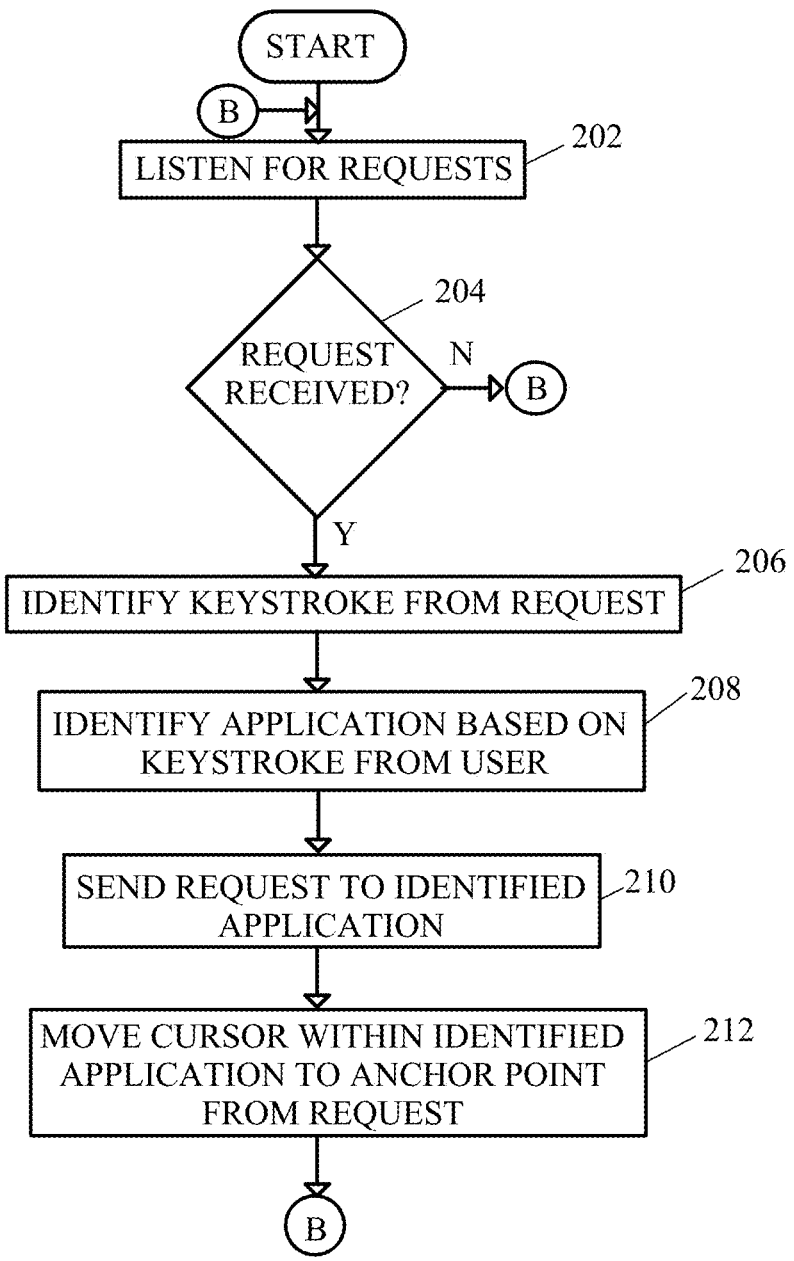
FIG. 4 shows a flow diagram of a method of using temporary dynamic anchor points within multiple documents through an application.

FIG. 4 shows a flow diagram of a method of using temporary dynamic anchor points within multiple documents through an application.

It should be noted that prior to the method of FIG. 4, anchor points within the multiple documents open by the user may be set using the steps of FIG. 2.

Specific keystrokes may be set as default to a particular set of keystrokes to allow up to n anchor points to be stored and referenced. For example, Using a selected keystroke combination of CTRL-ALT+SHIFT+<n> where n=1-0, as an example, CTRL-ALT+SHIFT+<n> could be set to mark/re-mark a current cursor location and then CTRL-ALT+<n> (same number and similar combination, but without SHIFT) may be used to activate and go to the prior saved location (anchor point).

For example, CTRL+ALT+SHIFT+1 sets/resets cursor location 1 and CTRL+ALT+1 activates and moves to previously selected location 1 whether the user is in the same document or in multiple documents. In addition, the controlling application, may include a mechanism for modifying default keystrokes.

In a first step, an anchor point program 66 listens for requests from a user (step 202). The anchor point program 66 may be a standalone program or part of an operating system.

If a request is not received (step 204), the method returns to step 202 of listening for a request.

If a request is received (step 204), a keystroke is identified from the request (step 206), for example by the anchor point program 66. The keystroke may be a retrieve keystroke or a set keystroke associated with a program. The keystroke may be a combination of keys such as a function key in addition to another key or a combination of gestures or other input from a user. Furthermore, while the functions keys from the keyboard may be used, gestures drawn on the screen, using menu actions, using physical buttons or other actions may also be used.

Based on the keystroke received, the application in which the keystroke corresponds is identified (step 208). The identification may be accomplished by comparing the received keystroke to a defined keystroke associated with a user and designated to a specific application or program, stored in a repository, for example repository 53.

The anchor point program 66 sends a request via API to the identified application (step 210).

The cursor within the identified application is moved to an anchor point or location associated with the request (step 212) and the method returns to step 202 of listening for requests.

The method may further include feedback to the user regarding the input of the keystrokes.

Since the controlling application utilizes the API to communicate with the applications in which documents may be open, there are circumstances in which the application may not recognize the keystroke received via API (e.g. if the user closed the document, modified the anchor point so that the previously selected anchor point no longer exists, requests an anchor point not previously set, application is closed, application is unresponsive etc . . . ). If the keystroke is not recognized by the application, the controlling application cannot complete the request and feedback regarding an indication of an error is provided to the controlling the application. The controlling application may send a notification to the user regarding why the requested action was not completed.

Figure 3:
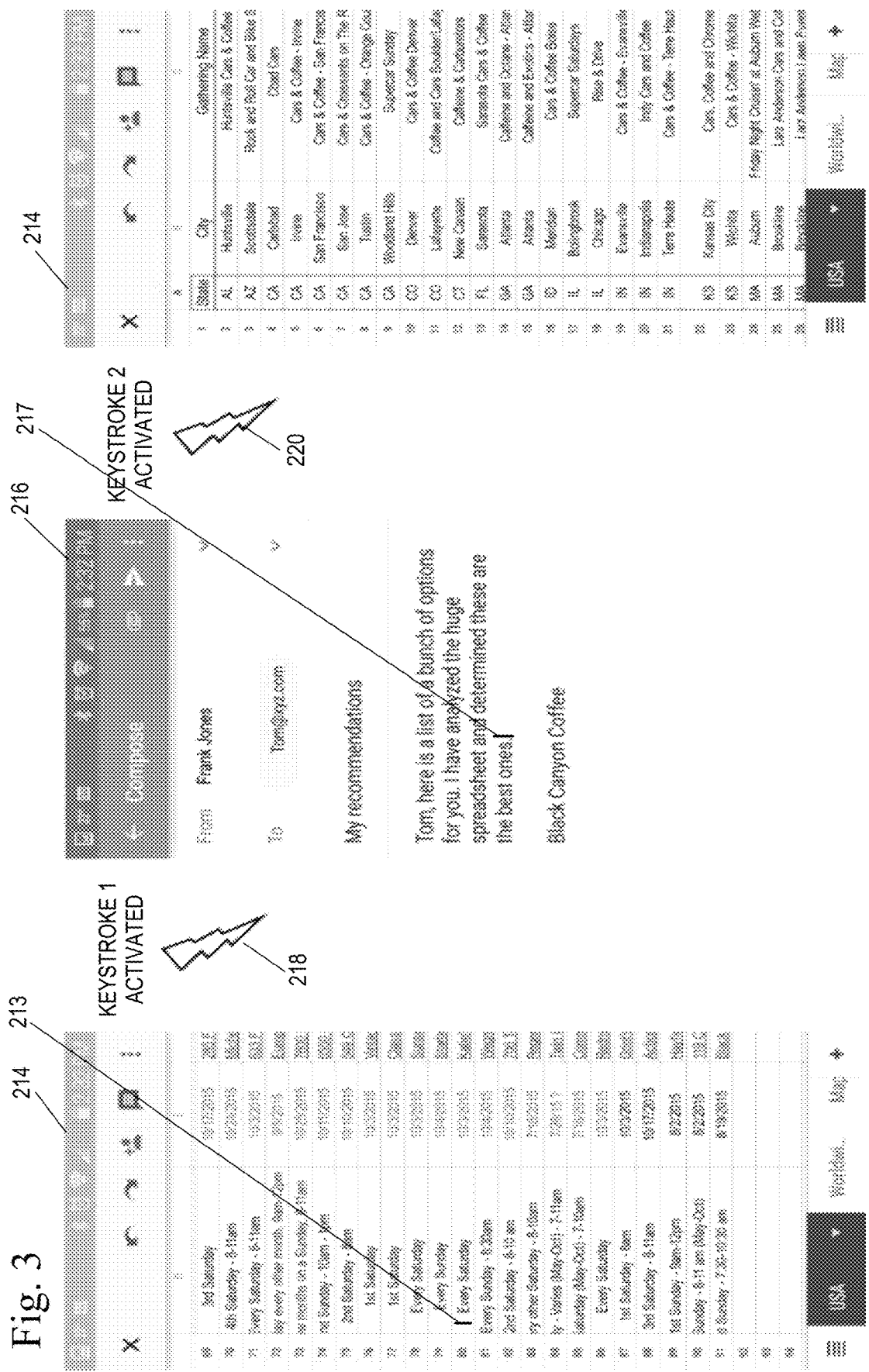
FIG. 3 shows an example of using anchor points within two documents.

FIG. 3 shows an example of using anchor points within two documents. A first application 214 has a large spreadsheet open, for example 20+ sheets, open on a mobile device. The user places a cursor at an anchor point 213 and provides a set keystroke or gesture to set the anchor point. The user opens a second application 216, for example an e-mail. While in the e-mail or second application 216, the user may use a second keystroke or gesture to set an anchor point 217 within the second application 216, for example within the body of the text of an e-mail. The user may then enter a retrieve keystroke 218 to return to an established, temporary cursor location in a specific cell of the spreadsheet of the first application through identification of the keystroke and API call methods. The user can copy the information needed, enter in another retrieve keystroke 220 to return to a cursor location within the body of the e-mail and paste in the information. Once the e-mail is sent and/or the spreadsheet or e-mail application are exited, the locations of the anchor points are terminated.

In another example, a user may be reviewing both a word processing document and spreadsheet on a personal computer, which utilizes side by side screen implementation. One of the two documents, either the word processing document or the spreadsheet, may be open and expanded to fill or take up the entire screen. When a keystroke is received and verified, through API call methods, an anchor point program 66 may resize the existing window containing the spreadsheet to the left half of the screen and the application document with the application corresponding to an anchor point appearing on the right half.

FIG. 5 illustrates internal and external components of a device computer 52 and server computer 54 in which illustrative embodiments may be implemented. In FIG. 5, a device computer 52 and a server computer 54 include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and anchor point program 66 are stored on one or more of the computer-readable tangible storage devices 830 for execution by one or more of the processors 820 via one or more of the RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Anchor point program 66 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Anchor point program 66 can be downloaded to the device computer 52 and server computer 54 from an external computer via a network (for example, the Internet, a local area network or other, wide area network) and network adapter or interface 836. From the network adapter or interface 836, anchor point program 66 is loaded into hard drive 830. Anchor point program 66 can be downloaded to the server computer 54 from an external computer via a network (for example, the Internet, a local area network or other, wide area network) and network adapter or interface 836. From the network adapter or interface 836, anchor point program 66 is loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Anchor point program 66 can be written in various programming languages including low-level, high-level, object-oriented or non object-oriented languages. Alternatively, the functions of an anchor point program 66 can be implemented in whole or in part by computer circuits and other hardware (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for navigating within multiple documents which are open in multiple open programs on a computer, the computer comprising at least one processor, one or more memories, one or more computer readable storage media, the computer program product comprising a computer readable storage medium having program instructions embodied therewith, the program instructions executable by the computer to perform a method comprising:
   receiving, by a controlling application of the computer, temporary anchor points set by a user in the multiple documents open in the multiple open programs without additional user interaction with the programs;
   receiving, by the controlling application of the computer, a request from the user comprising a keystroke;
   identifying, by the controlling application of the computer, the keystroke, an association of the keystroke with an open program of the multiple open programs, and a temporary anchor point previously set by the user within a document open in the open program which was associated with the keystroke; and
   sending, by the controlling application of the computer, a request to the open program which is associated with the keystroke, to cause the open program to move a cursor to the temporary anchor point within the open document in the open program.

2. The computer program product of claim 1, wherein the controlling application is in communication with the multiple open programs via an application program interface and the request sent to the identified open program is sent via the application program interface.

3. The computer program product of claim 1, wherein the keystroke is a retrieval keystroke.

4. The computer program product of claim 3, wherein the retrieval keystroke is selected from a group consisting of: a combination of at least two keys and a combination of gestures by a user.

5. The computer program product of claim 1, wherein the program instructions of identifying, by the controlling application of the computer, the keystroke, comprises the comparing, by the controlling application of the computer, the keystroke received from the user to stored keystrokes associated with the user.

6. The computer program product of claim 1, wherein the temporary anchor point is established by the program instructions of:
   receiving, by the controlling application of the computer, a set keystroke within the document from the user;
   verifying, by the controlling application of the computer, verifying the set keystroke;
   saving, by the controlling application, a cursor location within the document as a temporary anchor point to which the user can travel to by providing the set keystroke.

7. The computer program product of claim 6, wherein the set keystroke is selected from a group consisting of: a combination of at least two keys and a combination of gestures by a user.

8. The computer program product of claim 6, wherein the program instructions of verifying, by the controlling application of the computer, the set keystroke, comprises comparing, by the controlling application of the computer, the set keystroke received from the user to a stored keystroke associated with the user.

9. The computer program product of claim 1, wherein the temporary anchor point is removed from the document when the controlling application is closed.

10. The computer program product of claim 1, wherein the document is selected from a group consisting of: spreadsheets, word processing documents, and binary documents.

11. A computer system for navigating within multiple documents which are open in multiple open programs on a computer comprising at least one processor, one or more memories, one or more computer readable storage media having program instructions executable by the computer to perform the program instructions comprising:
   receiving, by a controlling application of the computer, temporary anchor points set by a user in the multiple documents open in the multiple open programs without additional user interaction with the programs;
   receiving, by the controlling application of the computer, a request from the user comprising a keystroke;
   identifying, by the controlling application of the computer, the keystroke, an association of the keystroke with an open program of the multiple open programs, and a temporary anchor point previously set by the user within a document open in the open program which was associated with the keystroke; and
   sending, by the controlling application of the computer, a request to the open program which is associated with the keystroke, to cause the open program to move a cursor to the temporary anchor point within the open document in the open program.

12. The computer system of claim 11, wherein the controlling application is in communication with the multiple open programs via an application program interface and the request sent to the identified open program is sent via the application program interface.

13. The computer system of claim 11, wherein the keystroke is a retrieval keystroke.

14. The computer system of claim 13, wherein the retrieval keystroke is selected from a group consisting of: a combination of at least two keys and a combination of gestures by a user.

15. The computer system of claim 11, wherein the program instructions of identifying, by the controlling application of the computer, the keystroke, comprises the comparing, by the controlling application of the computer, the keystroke received from the user to stored keystrokes associated with the user.

16. The computer system of claim 11, wherein the temporary anchor point is established by the program instructions of:

receiving, by the controlling application of the computer, a set keystroke within the document from the user;

verifying, by the controlling application of the computer, verifying the set keystroke;

saving, by the controlling application, a cursor location within the document as a temporary anchor point to which the user can travel to by providing the set keystroke.

17. The computer system of claim 16, wherein the set keystroke is selected from a group consisting of: a combination of at least two keys and a combination of gestures by a user.

18. The computer system of claim 16, wherein the program instructions of verifying, by the controlling application of the computer, the set keystroke, comprises comparing, by the controlling application of the computer, the set keystroke received from the user to a stored keystroke associated with the user.

19. The computer system of claim 11, wherein the temporary anchor point is removed from the document when the controlling application is closed.

* * * * *